United States Patent [19]

Stubben

[11] 4,164,759
[45] Aug. 14, 1979

[54] VOLTAGE CONTROLLED OSCILLATOR

[75] Inventor: David R. Stubben, Santa Clara, Calif.

[73] Assignee: Atari, Inc., Sunnyvale, Calif.

[21] Appl. No.: 861,189

[22] Filed: Dec. 16, 1977

[51] Int. Cl.² .............................................. H04N 3/22
[52] U.S. Cl. .................................... 358/180; 358/93; 331/111; 331/153
[58] Field of Search ............... 331/172, 173, 143, 150, 331/152, 153, 177 R, 111; 358/93, 180

[56] References Cited
U.S. PATENT DOCUMENTS

| | | | |
|---|---|---|---|
| Re. 28,598 | 10/1975 | Baer et al. ............................ | 358/93 |
| 3,924,202 | 12/1975 | Craft .................................... | 331/111 |
| 4,002,824 | 1/1977 | Petrocelli ........................... | 358/180 |

*Primary Examiner*—Richard Murray
*Attorney, Agent, or Firm*—Townsend and Townsend

[57] ABSTRACT

A voltage controlled oscillator having a substantially linear output over a wide range is used in video games to address picture memory means to thereby determine the size of the objects displayed on a raster type video screen. The oscillator produces an output signal having a frequency determined by an analog input voltage which is proportional to the desired size of the objects. The oscillator includes a variable current source controlled by the analog input voltage which stores charge in a capacitor. A pair of AND gates sink charge from the capacitor as determined by threshold means which senses the stored voltage. The periodic change in the output of the threshold means constitutes the output signal.

9 Claims, 7 Drawing Figures

VOLTAGE CONTROLLED OSCILLATOR

BACKGROUND OF THE INVENTION

The present invention is directed to a voltage controlled oscillator for use in varying the size of objects displayed on a raster type video screen.

Voltage controlled oscillating circuits in which the output signal has a frequency which varies linearly with an analog input voltage are useful in video displays. In particular, such oscillators are useful in electronic circuitry associated with video games. One use of such an oscillator is shown in U.S. patent application Ser. No. 809,314, filed June 23, 1977, in the names of Steven T. Mayer and Ronald E. Milner, and assigned to the assignee of the present invention. In that application, apparatus sold under the trademark "STARSHIP" is provided for changing the size of a displayed object to provide a realistic illusion of perspective.

To provide greater variation in object size it is desirable to use an oscillator having a large frequency range. It is also desirable to provide higher output frequencies which are needed to produce smaller objects. Such a capability allows objects to move to near a vanishing point on an ocean horizon. Heretofore, the only practical method of providing the above increased frequency range needed for such video displays was through heterodyning.

OBJECTS AND SUMMARY OF THE INVENTION

It is an object of the present invention to provide a voltage-controlled oscillator circuit which allows for a large change in output frequency.

It is another object of the invention to provide such an oscillator in which the changes in frequency are linear with respect to changes in the input voltage.

It is still another object of the invention to provide such an oscillator with a frequency range which allows for large variations in the size of objects displayed on a raster type video screen.

Accordingly, a voltage controlled oscillator is provided for producing a periodic output signal having a frequency determined by an analog input voltage. The oscillator includes a variable current source controlled by the analog input voltage. Capacitor means for storing charge are connected to the current source resulting in a stored voltage across the capacitor. Threshold means are provided responsive to the stored voltage crossing high and low thresholds to produce the periodic output signal. AND gate means are connected to the capacitor means to sink charge. The AND gate means thus vary the stored voltage by periodically draining charge from the capacitor means in response to the periodic output signal.

DESCRIPTION OF THE PREFERRED EMBODIMENT

Figure 1:
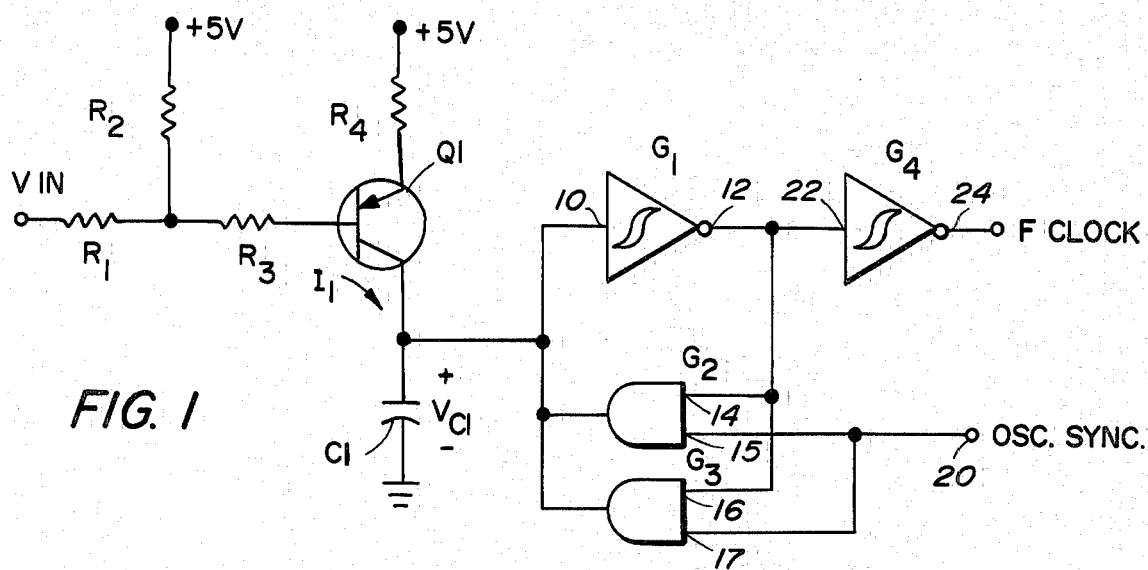
FIG. 1 is a detailed circuit diagram of the voltage controlled oscillator of the present invention.

The voltage controlled oscillator of the present invention is shown in detail in FIG. 1. $V_{in}$ is an analog input voltage proportional to the size of the object to be displayed and controls a variable current source. Such current source includes resisters $R_1$, $R_2$, $R_3$, and $R_4$ as well as transistor Q1. $R_1$, $R_2$, and $R_3$ set a bias level for the base voltage of the transistor. $V_{in}$ is optimally in the range of 0 to 3 volts. A voltage-controlled current $I_1$ is therefore provided from the collector of Q1 to capacitor C1 for storing charge. The stored charge results in a stored voltage $V_{C1}$ across the capacitor.

A Schmitt trigger gate $G_1$ functioning as threshold means has high and low threshold levels (as indicated by the hysteresis curve) at its input 10 and is responsive to changes in $V_{C1}$ to produce alternate binary logic levels at output 12. AND gate means for sinking charge from capacitor C1 comprise a pair of open collector AND gates $G_2$ and $G_3$ with their outputs connected to C1. A plurality of AND gates are used to increase the amount of charge which can be drawn from capacitor C1 and also to sink $I_1$. $G_2$ and $G_3$ each have two inputs and provide such charge sinking capability when either of their respective inputs 14 and 15 or 16 and 17, are zero. One input of each AND gate is connected to a synchronizing signal 20 which prevents the AND gates from being responsive to gate $G_1$. The other input of each AND gate is connected to the output 12 of $G_1$. If the output 12 of $G_1$ changes its binary logic level output and the sync signal 20 fed to inputs 15 and 17 is kept at one, gates $G_2$ and $G_3$ will periodically sink current, reducing $V_{C1}$, in response to the signal at 12. $G_4$ provides a second Schmitt trigger threshold means having an input 22 connected to the output 12 of the first-named threshold means $G_1$. The periodic signal supplied to input 22 produces a resultant periodic signal at output 24, $F_{clock}$. $G_4$ is used to improve the waveform of the signal produced by $G_1$.

In operation, and assuming a sync signal of "1" is supplied to inputs 15 and 17 of $G_2$ and $G_3$, $V_{in}$ produces a current $I_1$ which charges C1 unit $V_{C1}$ crosses the high threshold of gate $G_1$. At that point, output 12 goes from logic 1 to logic zero, turning on $G_2$ and $G_3$, which sink $I_1$ and also drain charge from C1, reducing $V_{C1}$. When $V_{C1}$ reaches the low threshold of $G_1$, output 12 goes from logic zero to logic 1 turning off $G_2$ and $G_3$ and allowing $V_{C1}$ to rebuild. Increases in $V_{in}$ produce a correspondingly smaller current $I_1$ thereby reducing the frequency of the periodic size control signal, $F_{clock}$. The relationship between voltage and frequency is substantially linear in the 1 to 25 MHz region and provides a greater than 5:1 range of frequencies.

One of the particularly valuable features of the VCO circuit shown in FIG. 1 is its large potential operating range which enhances its flexibility. More specifically, by changing the biasing resistors, $I_1$ can be large enough to provide for a greater than 5:1 range of voltage inputs. At the same time, capacitor C1 can be made small enough to provide increased output frequencies of 25 MHz or greater. Furthermore, these benefits are provided with a minimum number of components, all of which are inexpensive and readily available.

Figure 2A:
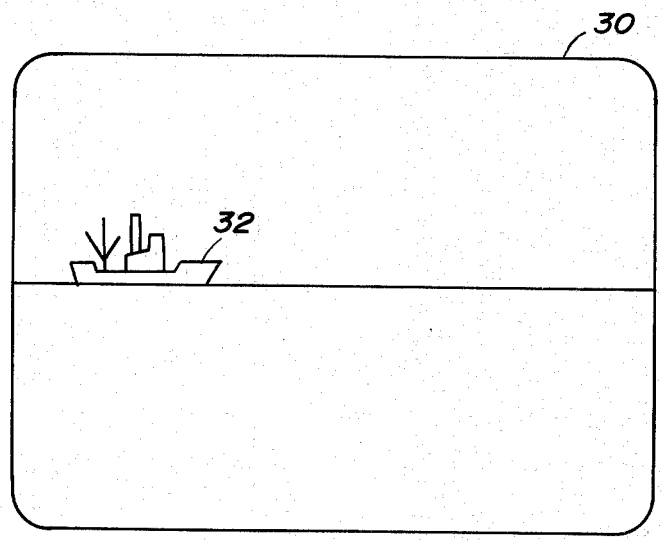
FIGS. 2A and 2B are diagramatic views of a video display screen indicating a change in object size in a video game display.
Figure 2B:
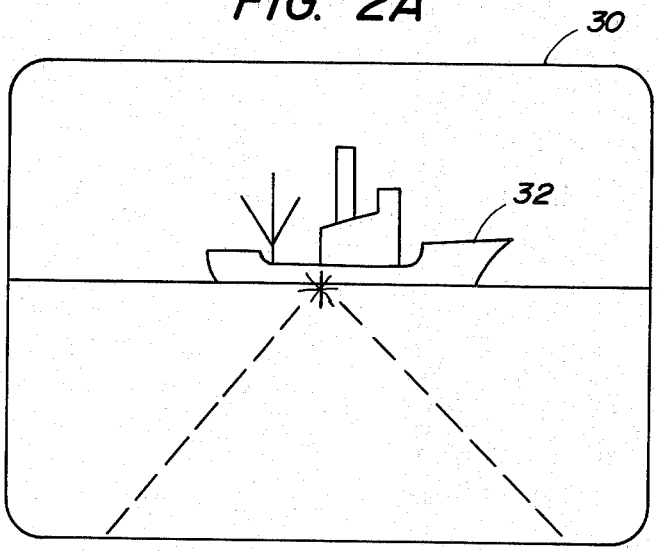

Referring to FIGS. 2A, 2B, 3A and 3B, the VCO of the present invention is used with various types of video games involving objects which are subjected to size changes. For example, FIGS. 2A and 2B illustrate a submarine simulation game called "Wolfpak." The game operator looks through a device which simulates a periscope and sees on the screen 30 ships crossing the line of sight or approaching from or receding towards the horizon. As the ship 32 enters the field of view at the left, as seen in FIG. 2A, it is small. As it approaches closer, it increases in size, as seen in FIG. 2B, facilitating a simulated "hit" with a torpedo. Ships enter the screen from either the right or the left and vary in size depending on their actual size and range.

Figure 3A:
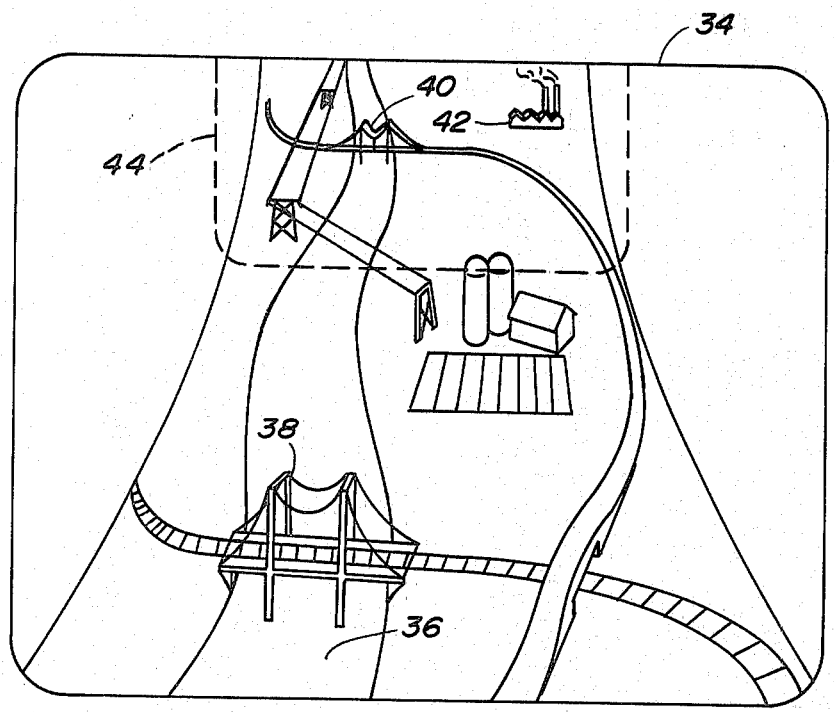
FIGS. 3A and 3B are diagramatic views of a video display screen as in FIGS. 2A and 2B illustrating another embodiment of a video game incorporating the present invention.
Figure 3B:
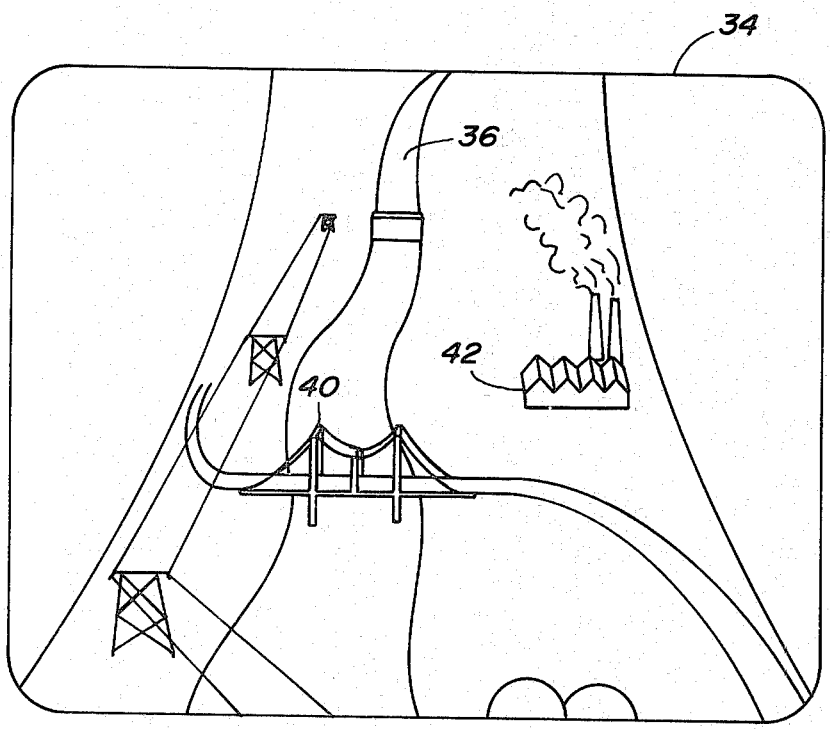

Another way in which changes in the size of objects on a video display can improve the realism of video games is illustrated in FIGS. 3A and 3B. There, the illusion is given of flying low over terrain in a game entitled "Jet Bomber." At a given point in time the operator views screen 34 as shown in FIG. 3A with various objects depicted on the screen such as river 36, bridges 38 and 40 and factory 42. To give the illusion of flying over these objects, the display appears to move off the bottom of the screen, bringing objects at the top downward and increasing their size. FIG. 3B illustrates screen 34 a few seconds after FIG. 3A is displayed. Note that the objects shown in portion 44 of FIG. 3A have moved to the bottom of the screen in FIG. 3B and are significantly enlarged. The game operator senses the movement over the terrain and seeks to bomb the industrial facilities illustrated.

Figure 4:
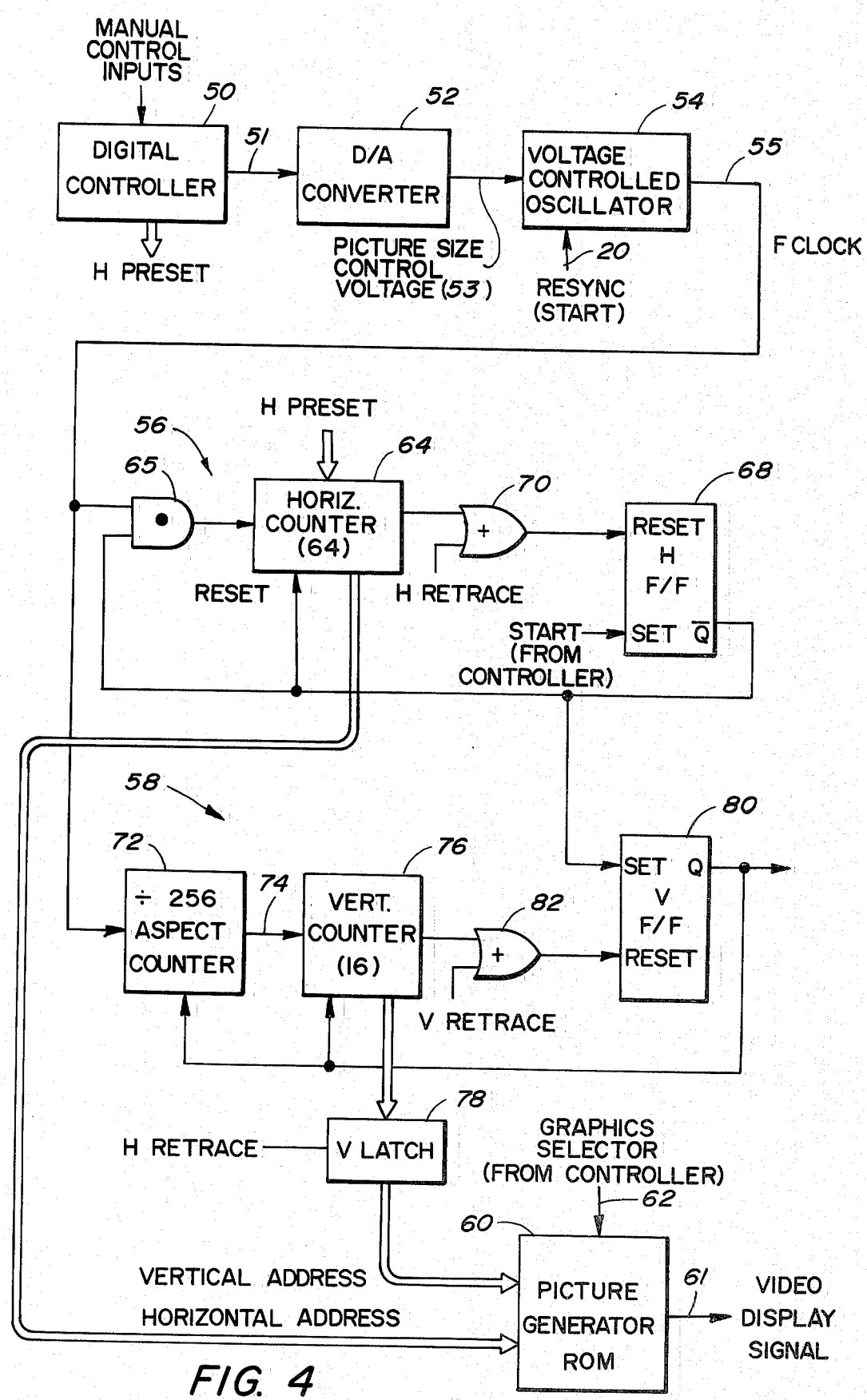
FIG. 4 is a block circuit diagram of one embodiment of size control circuitry using the present invention.
Figure 5:
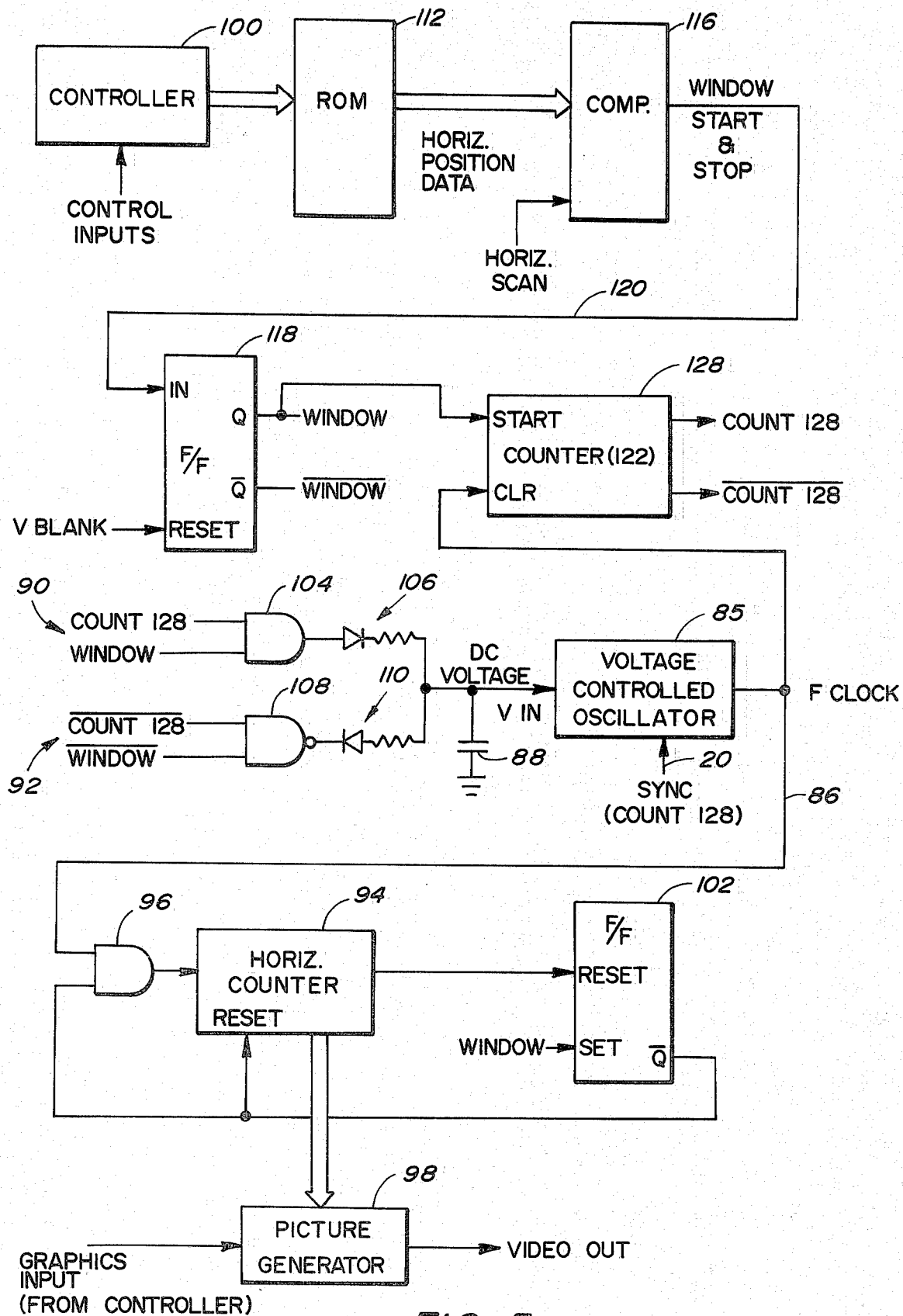
FIG. 5 is a block circuit diagram as in FIG. 4 showing another embodiment of video game circuitry using the present invention.

The basic circuitry which utilizes the VCO of the present invention and provides the illustrated changes in size are shown in FIGS. 4 and 5. FIG. 4 shows the size control circuitry for "Wolfpak," which is substantially similar to the circuitry described in the above copending "Starship" application. FIG. 5 shows the size control circuitry for "Jet Bomber."

Referring to FIG. 4, a digital controller 50, in the form of a microprocessor, represents that portion of the game circuitry which determines the movement and size of the objects on the screen. Controller 50 also receives inputs from the person operating the game in the form of manual control signals, for example the aiming controls for torpedos. Digital data corresponding to the size of the ships or other objects to be displayed is output on line 51. Converter 52 produces on line 53 an analog voltage $V_{in}$, which drives voltage controlled oscillator (VCO) 54 for producing an output signal having a frequency determined by the voltage present on line 53.

VCO 54 is the circuit of FIG. 1, with $V_{in}$ being the voltage on line 53. $F_{clock}$, as provided on line 55, is the size control signal representing the periodic output signal of the VCO. The VCO sync input 20 derives from a start signal supplied by controller 50. The sync signal is zero, stopping $F_{clock}$, until the start signal is received, at which point the sync signal becomes one. The purpose of the sync signal is to start each display line of the object on the video screen at the same phase.

The output of VCO 54, $F_{clock}$, on line 55, is a size control signal which has a frequency inversely proportional to the object size. As will be explained below, the higher the frequency on line 55, the smaller the object on the screen. The periodic signal on line 55 drives both a horizontal address circuit 56 and a vertical address circuit 58. Both address circuits are counter means for generating addresses to a picture memory means in the form of a picture generator read-only member (ROM) 60 which produces a video-display signal on line 61. ROM 60 is a picture generator means for storing addressable video resolution elements which form a video display, and has the capacity for storing several different objects, such as different types of ships. An input 62 from controller 50 determines which object will be displayed. After selecting the desired object in ROM 60, the appropriate video resolution elements of the objects selected are addressed by horizontal and vertical address circuits 56 and 58 in the manner described below.

The objects stored in picture generator 60 all contain 16 addressable vertical lines each having 64 addressable horizontal resolution elements. Horizontal and vertical address circuits 56 and 58 provide the addresses to the picture generator in a manner similar to that described in the copending "Starship" application, noted above. Horizontal counter 64 supplies the 64 horizontal addresses. Counter 64 is driven by the signal on line 55 through AND gate 65. The other coincidence signal to AND gate 65 which starts the display of an object is supplied by flip-flop 68. Flip-flop 68 is set by a start signal from controller 50 and is reset by either a horizontal retrace or a full count of counter 64 through OR gate 70. Vertical address circuit 58 is also driven by the signal on line 55. That signal is supplied to aspect counter 72 which divides the frequency by 256. That number represents the normalized ratio of resolution elements for a horizontal video line. Thus, counter 72 outputs a signal on line 74 corresponding to each scan line. Vertical counter 76 is responsive to the line signals on line 74 and in turn supplies the 16 addresses to ROM 60 by way of latch 78. Latch 78 is updated each horizontal retrace of the raster, and transmits the address from counter 76. Thus, if counter 76 is generating addresses faster than the horizontal retrace, latch 78 will skip some of the line addresses thereby reducing the vertical size of the image produced. Vertical counter 76 is reset by flip flop 80 upon completion of a full count of counter 76 or if a vertical retrace occurs. The reset signal is supplied by OR gate 82. Vertical preset is not required because the vertical position of an object is always set at the horizon. In "Wolfpak" the screen is viewed through a mirror which inverts the top and bottom of the screen. Thus all objects begin at the horizon line.

In operation, the "Wolfpak" size control circuitry generates addresses to picture generator ROM 60 at varying frequencies, depending on the voltage on line 53. At a given frequency, for example, the horizontal and vertical address circuits supply the 64 resolution element addresses on each of the 16 lines in a given time span. If the frequency on line 55 is increased by a decrease in the voltage on line 53 ($V_{in}$), the address will be generated at a faster rate. Since the scan pattern of the raster is unchanged, the size of each resolution element will decrease, as well as the number of vertical lines. At relatively high frequencies objects can be made to appear to substantially vanish at the horizon.

"Jet Bomber" produces a change in object size between the top and bottom of the screen using the VCO of the present invention. Referring to FIG. 5, VCO 85 produces a periodic output signal on line 86 having a frequency $F_{clock}$. $V_{in}$ is provided by a DC voltage across capacitor 88 which is controlled by a pair of charging and discharging circuits 90 and 92, respectively. In response to $V_{in}$, a frequency $F_{clock}$ is supplied on line 86 to horizontal counter 94 by way of AND gate 96. "Jet Bomber" uses a picture generator 98 containing addressable lines of picture data, each having 128 addressable resolution elements. Line addresses are supplied from game controller or microprocessor 100 and the resolution elements are addressed by counter 94. As in Wolfpak, a flip-flop 102 is used to start and reset horizontal counter 94.

To produce the change in $V_{in}$ over the course of a scan, charging and discharging circuits 90 and 92 operate to either supply or drain charge from capacitor 88. If inputs "Count 128" and "Window" to AND gate 104 are both one, charge is supplied to capacitor 88 by way of circuit 106. If "Count 128" and "Window" are both one, AND gate 108 drains charge from capacitor 88 by way of circuit 110.

The inputs to AND gates 104 and 108 are provided by game circuitry operated by controller 100. As in Wolfpak, the game controller receives control inputs from the player and determines the position of the objects on the screen. Object size depends on the video scan line. Each horizontal video line is assigned a predetermined video "window" which consists of a predetermined portion of the line. As can be seen from FIGS. 3A and 3B, the size of the window, which is the portion of each line on which objects are shown, varies between the top and bottom of the screen. As with Wolfpak, the Jet Bomber screen is reflected in a mirror inverting the top and bottom of the image. Consequently, the window begins at the top of the scan very large, extending over a full horizontal line. As the scan moves down the screen the window size decreases. Read only memory (ROM) 112 stores the video window data for each line of the video scan. Thus, a line address from controller 100 causes ROM 112 to output the horizontal position of the beginning and end of the video window on each line. That positional information is compared with the horizontal scan of the raster in comparator 116 which outputs a start and stop signal to flip-flop 118 on line 120. Flip-flop 118 outputs a logic one at either the "Window" or "Window" output, in response to the signal on line 120. The "Window" signal is supplied to the start input of a counter 128 which counts the cycles of the periodic signal from VCO 85 until a maximum of 128 is reached. Counter 128 outputs a logic one at the "Count 128" output until a count of 128 is reached, when the one is shifted to the "Count 128" output.

In operation, the Jet Bomber circuitry in combination with the VCO of the present invention operates to change the frequency with which addresses are supplied to picture generator 98 so that 128 resolution elements are always addressed within the span of a video window. Thus, all 128 resolution elements per line will be displayed. This is accomplished by continuously adjusting $V_{in}$ during the scan. For example, if counter 128 reaches a full count before the "Window" output of flip-flop 118 becomes one, additional charge is supplied to capacitor 88 by circuit 90. In essence, the early completion of the count indicates that the frequency is a bit too high and an increase in $V_{in}$ will lower it. Similarly, if counter 128 does not reach a count of 128 before the "Window" output of flip flop 118 becomes one, charge is drained from capacitor 88 by circuit 92.

When the bottom of the screen is reached, the DC voltage across capacitor 88 is low and the capacitor must be recharged before the start of the next scan. Therefore, during vertical retrace, flip-flop 118 produces a long "Window" signal which causes charging circuit 90 to fully recharge capacitor 88.

The sync signal 20 to VCO 85 is provided by the "Count 128" signal, which is one when the window is open. Thus, the periodic output signal is supplied on line 86 only when the video window is opened.

The "Jet Bomber" circuitry of FIG. 5 includes no vertical size adjustment provision such as line-skipping. Instead vertical size adjustments are accomplished by altering the scan pattern of the raster to provide more closely spaced lines at the top of the reflected picture and more widely spaced lines at the bottom, as viewed in FIGS. 3A and 3B. The foregoing size adjustment technique used in Jet Bomber is described and claimed in a copending patent application.

The VCO circuit of the present invention is useful in Jet Bomber because it is inexpensive and provides the necessary frequency range. Furthermore the output frequency $F_{clock}$ is linearly related to $V_{in}$. In Jet Bomber the frequency range needed to provide the effect of perspective is from 3 MHz to 9 MHz.

The invention therefore provides a voltage-controlled oscillator circuit allowing for a large change in output frequency. The change in frequency is linear with respect to input voltage. The VCO is useful in providing an output frequency range which allows for large variations in the size of objects displayed on a raster type video screen.

What is claimed is:

1. A voltage controlled oscillator for producing a periodic output signal having a frequency determined by an analog input voltage comprising: a variable current source controlled by said analog input voltage and producing a current that is proportional to said analog voltage, capacitor means coupled to said current source for receiving said current and for storing a charge resulting in a stored voltage across said capacitor means, threshold means responsive to said stored voltage crossing high and low thresholds to produce said periodic output signal, and gate means connected to said capacitor means for sinking charge, said gate means varying said stored voltage by periodically draining charge from said capacitor means in response to said periodic output signal.

2. A voltage controlled oscillator as in claim 1 in which said gate means comprises AND gate means having at least two inputs and an output with the output connected to said capacitor means for sinking charge, one input being connected to said threshold means and responsive to said periodic output signal and the other input being connected to a synchronizing signal for inhibiting said AND gate means from sinking charge in the presence of said periodic output signal.

3. A voltage controlled oscillator as in claim 1 in which said gate means is an open collector gate.

4. A voltage controlled oscillator as in claim 1 in which said gate means includes a plurality of gates connected in parallel thereby increasing the amount of charge drained from said capacitor means.

5. A voltage controlled oscillator as in claim 1 in which said threshold means is a Schmitt trigger which provides an output signal varying between two different logic levels.

6. A voltage controlled oscillator as in claim 5 further including second threshold means and in which said periodic output signal from said first-named threshold means is supplied to said second threshold means.

7. Apparatus for varying the size of objects displayed on a raster type video screen in proportion to an analog control voltage comprising: variable oscillator means for producing a size control signal having a frequency determined by said analog control voltage, said variable oscillator means including, a variable current source controlled by said analog control voltage, capacitor means for storing charge from said current source resulting in a stored voltage across said capacitor means, threshold means responsive to said stored voltage crossing high and low thresholds to produce said size control signal, and current sink means connected to said capacitor means for varying said stored voltage by periodically draining charge from said capacitor means in response to said size control signal, said apparatus further comprising picture memory means for storing addressable video resolution elements which form a video display, and counter means driven by said size control signal for generating addresses for said picture memory means whereby the frequency at which said video resolution elements are addressed determines the size of the objects displayed.

8. A voltage controlled oscillator for producing a periodic output signal having a frequency determined by an analog input voltage comprising: a variable current source controlled by said analog input voltage, capacitor means for storing charge from said current source resulting in a stored voltage across said capacitor means, threshold means responsive to said stored voltage crossing high and low thresholds to produce said periodic output signal, and gate means having at least two inputs and an output with the output connected to said capacitor means for sinking charge, one input being connected to said threshold means and responsive to said periodic output signal to vary said stored voltage by periodically draining charge from said capacitor means and the other input being connected to a synchronizing signal for inhibiting said gate means from sinking charge in the presence of said periodic output signal.

9. A voltage controlled oscillator for producing a periodic output signal having a frequency determined by an analog input voltage comprising: a variable current source controlled by said analog voltage, capacitor means for storing charge from said current source resulting in a stored voltage across said capacitor means, threshold means responsive to said stored voltage crossing high and low thresholds to produce said periodic output signal, and a plurality of gate means connected in parallel and to said capacitor means for sinking charge, said gate means varying said stored voltage by periodically draining charge from said capacitor means in response to said periodic output signal.

* * * * *